(12) United States Patent
Brennan

(10) Patent No.: US 10,698,497 B2
(45) Date of Patent: Jun. 30, 2020

(54) VEIN SCANNING DEVICE FOR AUTOMATIC GESTURE AND FINGER RECOGNITION

(71) Applicant: Apple Inc., Cupertino, CA (US)

(72) Inventor: Michael R. Brennan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/101,228

(22) Filed: Aug. 10, 2018

(65) Prior Publication Data

US 2019/0101991 A1 Apr. 4, 2019

Related U.S. Application Data

(60) Provisional application No. 62/565,364, filed on Sep. 29, 2017.

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06K 9/00355* (2013.01);
(Continued)

(58) Field of Classification Search
None
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Kenneth B Lee, Jr.
(74) *Attorney, Agent, or Firm* — Brownstein Hyatt Farber Schreck, LLP

(57) ABSTRACT

This relates to a device capable of automatically determining a user's gesture and/or finger positions based on one or more properties of the user's veins and methods for operation thereof. The device can include one or more sensors (e.g., a camera) to capture one or more images of the user's hand. The device can convert the image(s) to digital representations and can correlate the digital image(s) of the veins to one or more poses. From the pose(s), the device can determine the user's hand movements, and one or more gestures and/or finger positions can be determined from the hand movements. The device can interpret the gestures and/or finger positions as one or more input commands, and the device can perform an operation based on the input command(s). Examples of the disclosure include using the user input commands in virtual reality applications.

20 Claims, 11 Drawing Sheets

(51) Int. Cl.
  *G06T 7/246* (2017.01)
  *G06K 9/00* (2006.01)
  *G06K 9/03* (2006.01)
  *G06K 9/62* (2006.01)

(52) U.S. Cl.
  CPC ..... *G06K 9/00389* (2013.01); *G06K 9/00885* (2013.01); *G06K 9/03* (2013.01); *G06T 7/248* (2017.01); *G06K 9/6267* (2013.01); *G06K 2009/00932* (2013.01); *G06T 2207/10048* (2013.01)

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 9,679,197 B1 * | 6/2017 | Sills ............. G06F 3/017 |
| 9,696,808 B2 | 7/2017 | Nishihara et al. |
| 2006/0197753 A1 | 9/2006 | Hotelling |
| 2015/0258432 A1 | 9/2015 | Stafford et al. |
| 2015/0309629 A1 * | 10/2015 | Amariutei ............. G06F 3/017 345/173 |
| 2016/0210504 A1 | 7/2016 | Kim |
| 2017/0011210 A1 * | 1/2017 | Cheong ............. A61B 5/0022 |
| 2017/0123487 A1 * | 5/2017 | Hazra ............. G06F 1/163 |
| 2017/0147075 A1 * | 5/2017 | Lerner ............. G06F 3/017 |

FOREIGN PATENT DOCUMENTS

| | | |
|---|---|---|
| KR | 20140087866 A | 7/2014 |
| WO | 2019067096 A1 | 4/2019 |

OTHER PUBLICATIONS

Rubine. D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Nov. 2, 2018, for PCT Application No. PCT/US2018/046375, filed Aug. 10, 2018, six pages.

* cited by examiner

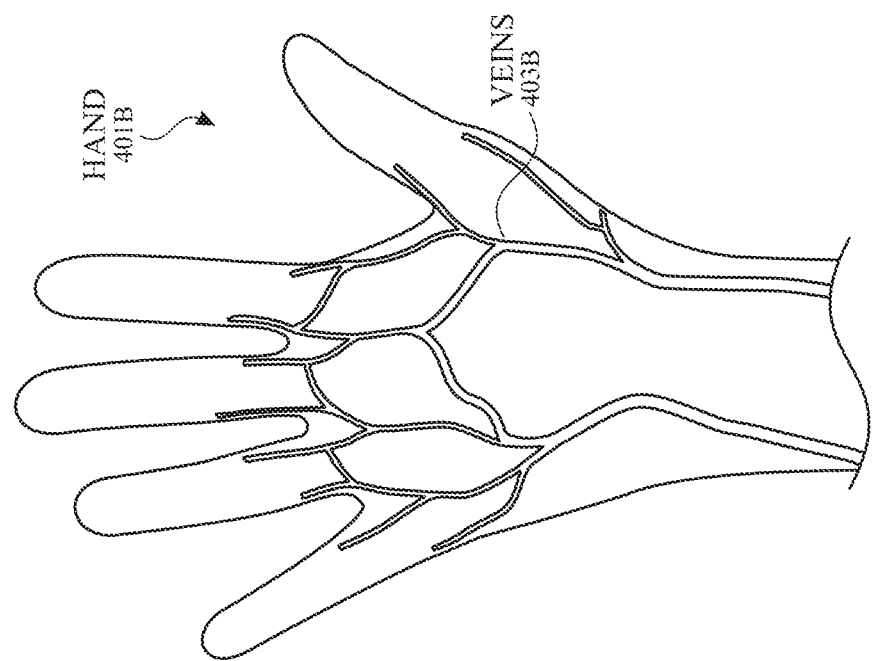
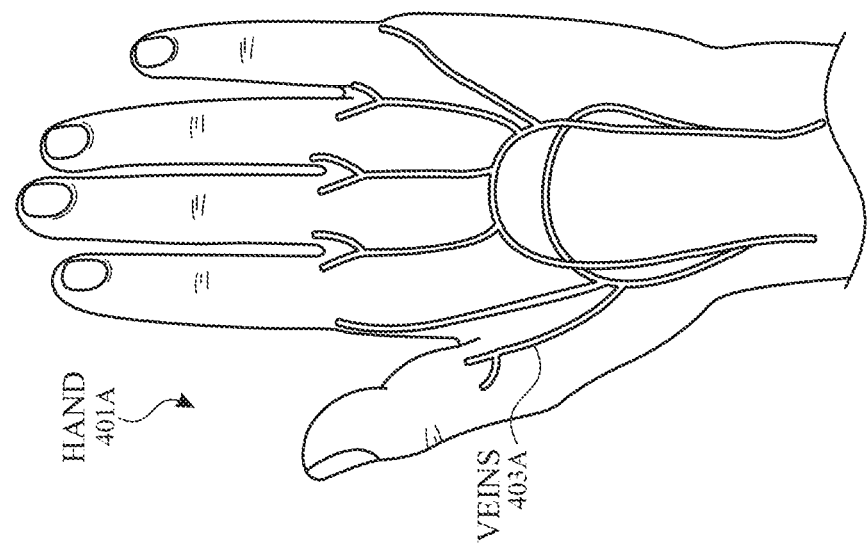

VEIN SCANNING DEVICE FOR AUTOMATIC GESTURE AND FINGER RECOGNITION

CROSS-REFERENCE TO RELATED APPLICATIONS

This application claims the benefit under 35 USC 119(e) of U.S. Patent Application No. 62/565,364, filed Sep. 29, 2017, the contents of which are incorporated herein by reference in their entirety for all purposes.

FIELD

This relates generally to a device configured to capture one or more images of a user's veins. More particularly, the disclosure relates to a device capable of automatically determining a gesture and/or finger positions using images of the user's veins and receiving the gesture and/or finger positions as input to the device without requiring touch and voice input.

BACKGROUND

Many existing portable electronic devices use voice or touch input as a method for the user to communicate commands to the devices or to control the devices. One example is a voice command system, which can map specific verbal commands to operations, for example, to initiate dialing of a telephone number by speaking the person's name. Another example is a touch input system, where the user can choose a specific device setting, such as adjusting the volume of the speakers, by touching a series of virtual buttons or performing a touch gesture. While voice and touch input can be an effective way to control a device, there may be situations where the user's ability to speak the verbal command or perform the touch gesture may be limited.

SUMMARY

This relates to a device and methods for operating a device capable of automatically determining a user's gesture and/or finger positions based on one or more properties of the user's veins and changes in the properties as the user performs poses and/or hand movements (e.g., finger movements). The device can include one or more sensors (e.g., a camera) to capture one or more images of the user's hand. The device can convert the image(s) to digital representations and can correlate the digital image(s) of the veins to one or more poses. From the pose(s), the device can determine the user's hand movements (e.g., finger movements), and one or more gestures and/or finger positions can be determined from the hand movements (e.g., finger movements). The device can interpret the gestures and/or finger positions as one or more input commands, and the device can perform an operation based on the input command(s). By detecting movements of the user's veins and associating the movements with input commands, the device can receive user input commands through another means in addition to, or instead of, voice and touch input, for example. Examples of the disclosure include using the user input commands in virtual reality (VR) (including augmented reality (AR) and mixed reality (MR)) applications.

BRIEF DESCRIPTION OF THE DRAWINGS

FIGS. 4A-4B illustrate top views of an exemplary user's hand according to examples of the disclosure.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples. Numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

This relates to a device and methods for operating a device capable of automatically determining a user's gesture and/or finger positions based on one or more properties of the user's veins and changes in the properties as the user performs poses and/or hand movements (e.g., finger movements). The device can include one or more sensors (e.g., a camera) to capture one or more images of the user's hand. The device can convert the image(s) to digital representations and can correlate the digital image(s) of the veins to one or more poses. From the pose(s), the device can determine the user's hand movements (e.g., finger movements), and one or more gestures and/or finger positions can be determined from the hand movements (e.g., finger movements). The device can interpret the gestures and/or finger positions as one or more input commands, and the device can perform an operation based on the input command(s). By detecting movements of the user's veins and associating the movements with input commands, the device can receive user input commands through another means in addition to, or instead of, voice and touch input, for example.

Representative applications of the apparatus and methods according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Figure 1:
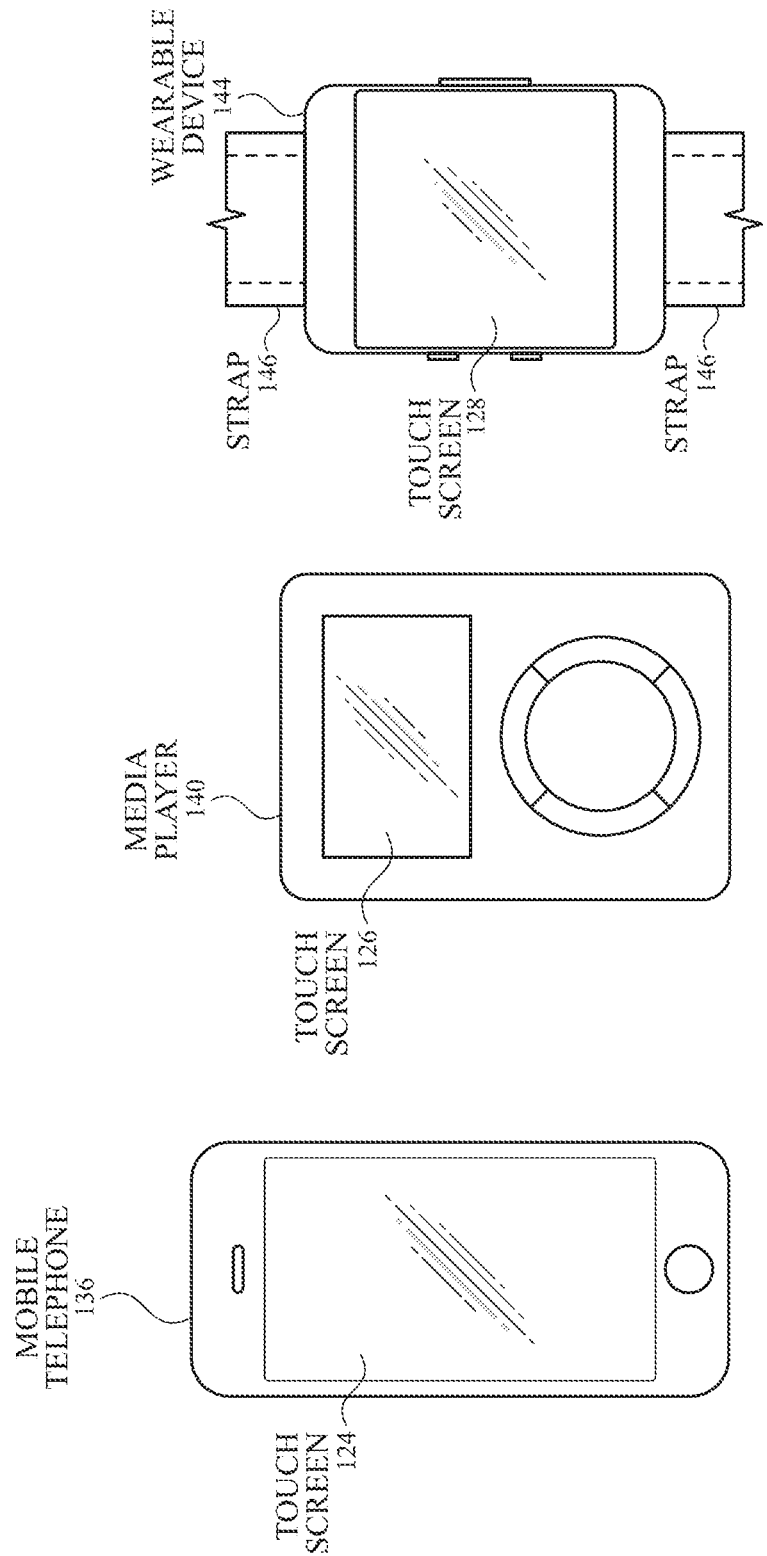
FIGS. 1A-1C illustrate systems in which examples of the disclosure can be implemented.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146. The systems of FIGS. 1A-1C can utilize the near-IR vein scanning device and methods for operation thereof, as will be disclosed.

Figure 2:
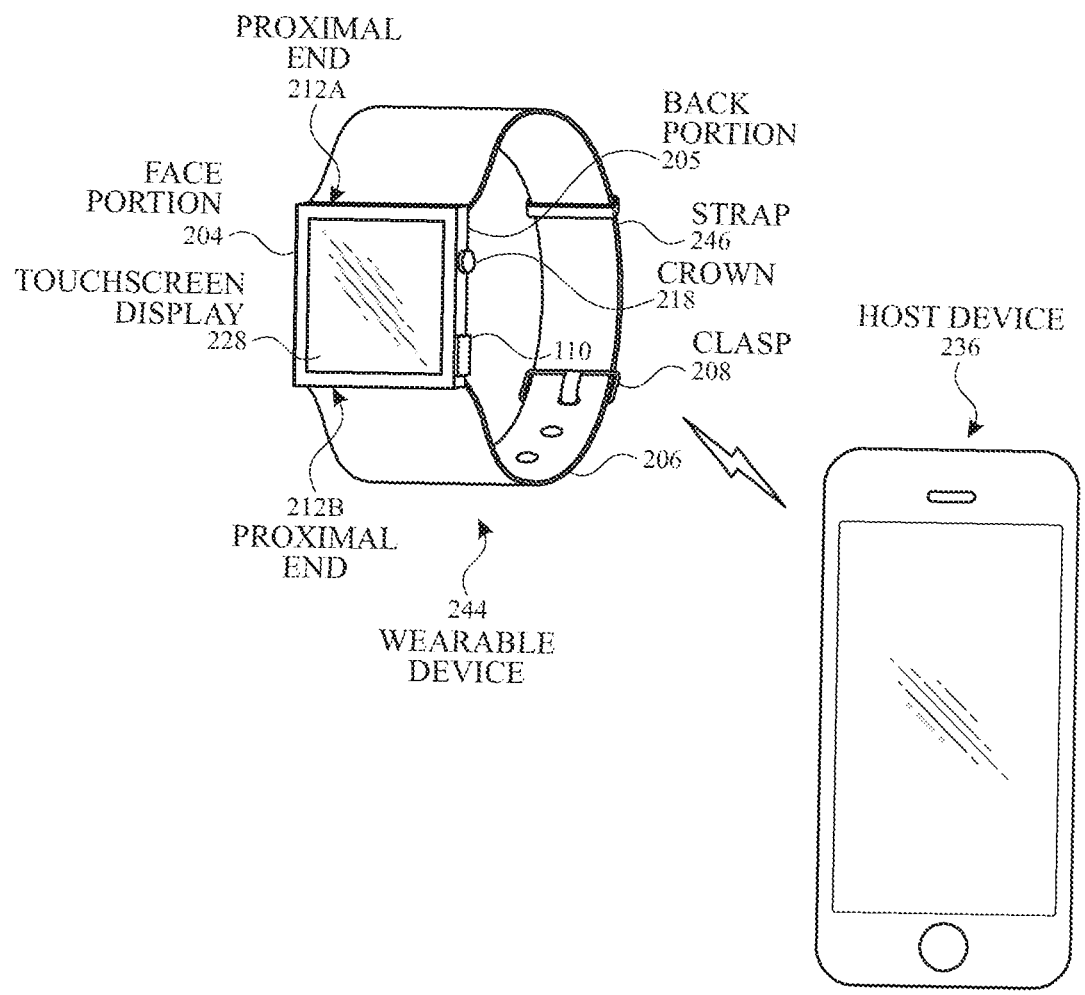
FIG. 2 illustrates an exemplary wearable device communicating wirelessly with a host device according to examples of the disclosure.

FIG. 2 illustrates an exemplary wearable device communicating wirelessly with a host device according to examples of the disclosure. The wearable device 244 can be a wristwatch-like device with a face portion 204 connected to a strap 246. The face portion 204 can include, for example, a touchscreen display 228 that can be appropriately sized depending on where the wearable device 244 is intended to be worn. The user can view information presented by the wearable device 244 on the touchscreen display 228 and can provide input to the wearable device 244 by touching the touchscreen display 228. In some examples, the touchscreen display 228 can occupy most or all of the front surface of the face portion 204.

Opposite from the face portion 204 can be a back portion 205. The back portion 205 can include one or more sensors for measuring physiological information (discussed below). Further, the back portion 205 (in addition to or instead of other components included in the device) can include near-IR/IR cameras for vein scanning, as discussed below.

The strap 246 (also referred to herein as a wristband or wrist strap) can be provided to allow the wearable device 244 to be removably worn (e.g., around the user's wrist) by the user. In some examples, the strap 246 can include a flexible material (e.g., fabrics, flexible plastics, leather, chain links, or flexibly interleaved plates or links made of metal or other rigid materials) and can be connected to the face portion 204 (e.g., by hinges, loops, or other suitable attachment devices or holders). In some examples, the strap 246 can be made of two or more sections of a rigid material joined by a clasp 208. One or more hinges can be positioned at the junction of the face portion 204 and the proximal ends 212A and 212B of the strap 246 and/or elsewhere along the lengths of strap 246 (e.g., to allow a user to put on and take off the wearable device 244). Different portions of the strap 246 can include different materials. For example, the strap 246 can include flexible or expandable sections alternating with rigid sections. In some examples, the strap 246 can include removable sections, allowing the wearable device 244 to be resized to accommodate a particular user's wrist size. In some examples, the strap 246 can include portions of a continuous strap member that runs behind or through the face portion 204. The face portion 204 can be detachable from the strap 246, permanently attached to the strap 246, or integrally formed with the strap 246.

In some examples, the strap 246 can include the clasp 208 that can facilitate with the connection and disconnection of the distal ends of the strap 246. In some examples, the clasp 208 can include buckles, magnetic clasps, mechanical clasps, snap closures, etc. In some examples, the wearable device 244 can be resized to accommodate a particular user's wrist size. Accordingly, the wearable device 244 can be secured to a user's person (e.g., around the user's wrist) by engaging the clasp 208. The clasp 208 can be subsequently disengaged to facilitate removal of the wearable device 244 from the user's person.

In some examples, the strap 246 can be formed as a continuous band of an elastic material (including, for example, elastic fabrics, expandable metal links, or a combination of elastic and inelastic sections), allowing the wearable device 244 to be put on and taken off by stretching a band formed by the strap 246 connecting to the face portion 204. In some instances, the clasp 208 may not be required.

The strap 246 (including any clasp that may be present) can include one or more sensors that can allow the wearable device 244 to determine whether the device is worn by the user at any given time. The wearable device can operate differently depending on whether the device is currently being worn or not. For example, the wearable device 244 can inactivate various user interface and/or RF interface components when it is not being worn. In addition, in some examples, the wearable device 244 can notify a host device 236 when a user puts on or takes off the wearable device 244. Further, the strap 246 (in addition to, or instead of other components included in the device) can include near-IR/IR cameras for vein scanning, as discussed below.

The wearable device 244 can also include a crown 218. The crown 218 can be a mechanical component (e.g., a cap atop a stem or shaft for winding a watch). The user can press, rotate, and/or touch the crown to provide input to the wearable device. For example, the crown 218 can rotate in multiple (e.g., two) directions of rotation (e.g., forward and backward, or clockwise and counter-clockwise). The crown 218 can also be pushed in towards the touchscreen display 228 (e.g., like a button) and/or be pulled away from the touchscreen display 228. The crown 218 can be touch-sensitive, for example, using capacitive touch technologies (e.g., self-capacitance, mutual capacitance) or other suitable technologies as described herein that can detect whether a user is touching the crown. In some examples, the crown 218 can also be used as part of a sensor to detect touch and/or proximity of an object (e.g., a finger) to the crown 218. The crown 218 can further be configured, in some examples, to tilt in one or more directions or slide along a track at least partially around a perimeter of the housing of the wearable device 244. In some examples, more than one crown 218 can be included in the wearable device 244. Further, the crown 218 (in addition to or instead of other components included in the device) can include near-IR/IR cameras for vein scanning, as discussed below.

The host device 236 can be any device that can communicate with the wearable device 244. Although the host device 236 is illustrated in the figure as a smart phone, examples of the disclosure can include other devices, such as a tablet computer, a media player, any type of mobile device, a laptop or desktop computer, or the like. Other examples of host devices can include point-of-sale terminals, security systems, environmental control systems, and so on. The host device 236 can communicate wirelessly with the wearable device 244 using, for example, protocols such as Bluetooth or Wi-Fi. In some examples, the wearable device 244 can include an electrical connector (not shown) that can be used to provide a wired connection to the host device 236 and/or to other devices (e.g., by using suitable cables). For example, the connector can be used to connect to a power supply to charge an onboard battery (not shown) of the wearable device 244.

In some examples, the wearable device 244 and the host device 236 can interoperate to enhance functionality available on the host device 236. For example, the wearable device 244 and the host device 236 can establish a pairing using a wireless communication technology, such as Bluetooth. While the devices are paired, the host device 236 can send notifications of selected events (e.g., receiving a phone call, text message, or email message) to the wearable device 244, and the wearable device 244 can present corresponding alerts to the user. The wearable device 244 can also provide an input interface via which a user can respond to an alert (e.g., to answer a phone call or reply to a text message). In some examples, the wearable device 244 can also provide a user interface that can allow a user to initiate an action on the host device 236, such as unlocking the host device 236 or turning on its display screen, placing a phone call, sending a text message, or controlling media playback operations of the host device 236. Techniques described herein can be adapted to allow a wide range of host device functions to be enhanced by providing an interface via the wearable device 244.

It will be appreciated that the wearable device 244 and the host device 236 are illustrative and that variations and modifications are possible. For example, the wearable device 244 can be implemented in a variety of wearable articles, including a watch, a bracelet, or the like. In some examples, the wearable device 244 can be operative regardless of whether the host device 236 is in communication with the wearable device 244; a separate host device may not be required.

Figure 3:
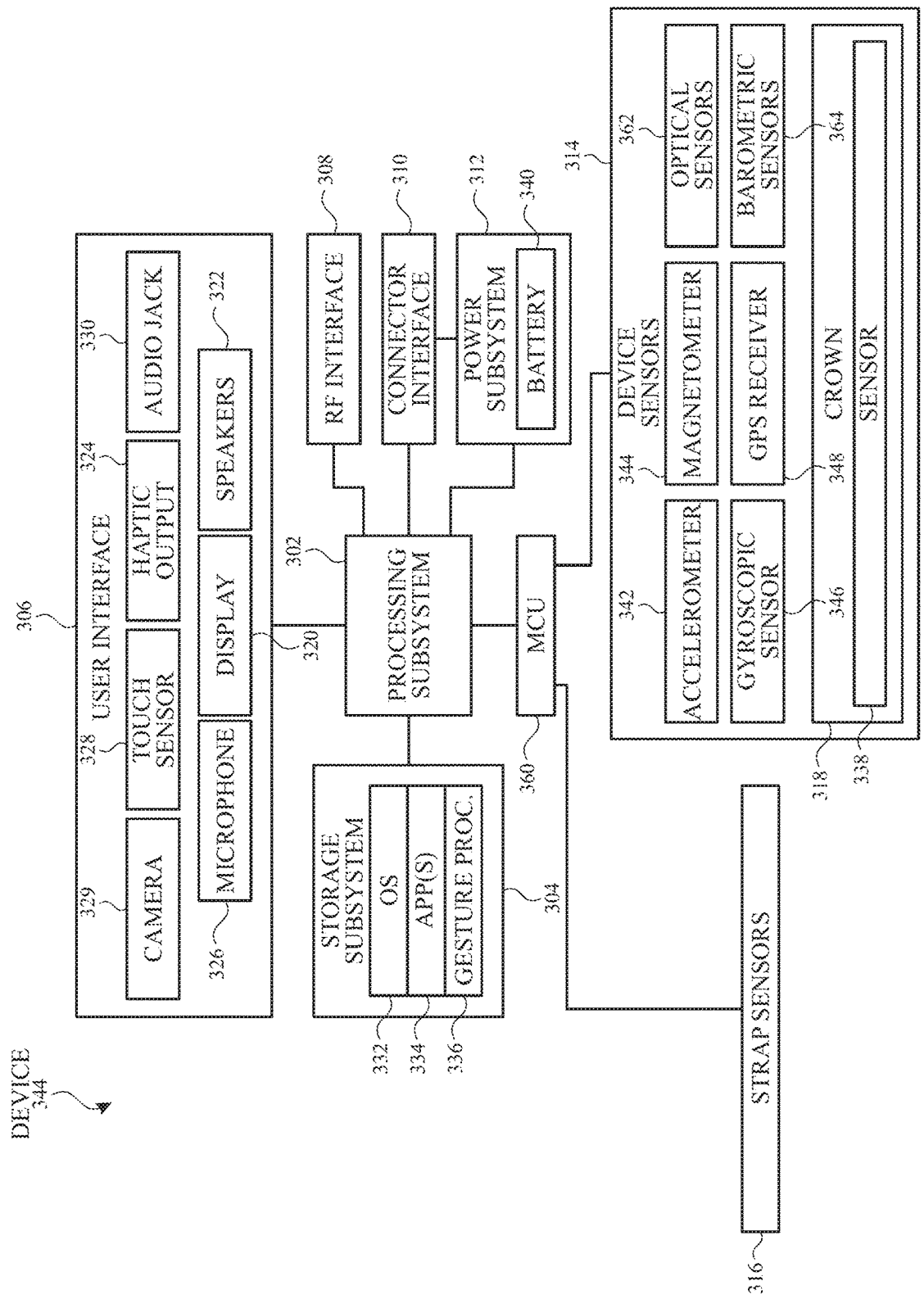
FIG. 3 illustrates a block diagram of an exemplary wearable device according to examples of the disclosure.

FIG. 3 illustrates a block diagram of an exemplary wearable device according to examples of the disclosure. The device 344 can include a processing subsystem 302, a storage subsystem 304, a user interface 306, a RF interface 308, a connector interface 310, a power subsystem 312, device sensors 314, and strap sensors 316. The device 344 can also include other components (not explicitly shown)

The storage subsystem 304 can be implemented using, for example, magnetic storage media, flash memory, other semiconductor memory (e.g., DRAM, SRAM), or any other non-transitory storage medium, or a combination of media, and can include volatile and/or non-volatile media. In some examples, the storage subsystem 304 can store media items such as audio files, video files, image or artwork files. The storage subsystem 304 can also store information from a user's contacts (e.g., names, addresses, phone numbers, etc.), information about a user's scheduled appointments and events, notes, and/or other types of information. In some examples, the storage subsystem 304 can also store one or more application programs ("apps") 334 (e.g., video game programs, personal information management programs, media playback programs, interface programs associated with particular host devices, and/or host device functionalities, etc.) to be executed by the processing subsystem 302.

The user interface 306 can include any combination of input and output devices. A user can operate the input devices included in the user interface 306 to invoke the functionality of the device 344 and can view, hear, and/or otherwise experience output from the device 344 via the output devices of the user interface 306.

Examples of output devices can include a display 320, speakers 322, and a haptic output generator 324. The display 320 can be implemented using compact display technologies (e.g., liquid crystal display (LCD), light-emitting diodes (LEDs), organic light-emitting diodes (OLEDs), or the like). In some examples, the display 320 can incorporate a flexible display element or curved-glass display element, allowing the device 344 to conform to a desired shape. One or more speakers 322 can be provided using small-form-factor speaker technologies, including any technology capable of converting electronic signals into audible sound waves. In some examples, the speakers 322 can be used to produce tones (e.g., beeping or ringing) and can, but need not, be capable of reproducing sounds such as speech or music with any particular degree of fidelity. The haptic output generator 324 can be, for example, a device that can convert electronic signals into vibrations. In some examples, the vibrations can be strong enough to be felt by a user wearing the device 344, but not so strong as to produce distinct sounds.

Examples of input devices can include a microphone 326, a touch sensor 328, and a camera 329. The microphone 326 can include any device that converts sound waves into electronic signals. In some examples, the microphone 326 can be sufficiently sensitive to provide a representation of specific words spoken by a user. In some examples, the microphone 326 can be usable to provide indications of general ambient sound levels without necessarily providing a high-quality electronic representation of specific sounds.

The touch sensor 328 can include, for example, a capacitive sensor array with the ability to localize contacts to a particular point(s) or region on the surface of the sensor. In some examples, the touch sensor 328 can distinguish multiple simultaneous contacts. In some examples, the touch sensor 328 can be overlaid over the display 320 to provide a touchscreen interface (e.g., touchscreen display 228 of FIG. 2), and the processing subsystem 302 can translate touch events (including taps and/or other gestures made with one or more contacts) into specific user inputs depending on what is currently displayed on the display 320.

The camera 329 can include, for example, a compact digital camera that includes an image sensor such as a CMOS sensor and optical components (e.g., lenses) arranged to focus an image onto the image sensor, along with control logic operable to use the imaging components to capture and store still and/or video images. Images can be stored, for example, in the storage subsystem 304 and/or transmitted by the device 344 to other devices for storage. Depending on implementation, the optical components can provide a fixed focal distance or variable focal distance. In some examples, with a variable focal distance, autofocus can be provided. In some examples, the camera 329 can be disposed along an edge of the face member (e.g., top edge of the face portion 204 of FIG. 2) and oriented to allow a user to capture images of nearby objects in the environment, such as a bar code or QR code. In some examples, the camera 329 can be disposed on the front surface of the face portion (e.g., to capture images of the user). In some examples, the camera can be located on the back portion (e.g., back portion 205 illustrated in FIG. 2) and can capture images of the user (e.g., the user's hand). Any number of cameras can be provided, depending on the implementation.

In some examples, the user interface 306 can provide output to and/or receive input from an auxiliary device, such as a headset. For example, the audio jack 330 can connect via an audio cable (e.g., a standard 2.5-mm or 3.5-mm audio cable) to an auxiliary device. The audio jack 330 can include input and/or output paths. Accordingly, the audio jack 330 can provide audio to and/or receive audio from the auxiliary device. In some examples, a wireless connection interface can be used to communicate with an auxiliary device.

The processing subsystem 302 can be implemented as one or more integrated circuits (e.g., one or more single-core or multi-core microprocessors or microcontrollers). In operation, the processing system 302 can control the operation of the device 344. In some examples, the processing subsystem 302 can execute a variety of programs in response to program code and can maintain multiple concurrently executing programs or processes. At any given time, some or all of the program code to be executed can be stored in the processing subsystem 302 and/or in storage media such as storage subsystem 304.

Through suitable programming, the processing subsystem 302 can provide various functionality for the device 344. For example, the processing subsystem 302 can execute an operating system (OS) 332 and various apps 334 such as a phone-interface application, a text-message-interface application, a media interface application, a fitness application, and/or other applications. In some examples, some or all of these appls 334 can interface with a host device, for example, by generating messages to be sent to the host device and/or by receiving and interpreting messages from the host device. In some examples, some or all of the application programs can operate locally to the device 344. For example, if the device 344 has a local media library stored in the storage subsystem 304, a media interface application can provide a user interface to select and play locally stored media items. The processing subsystem 302 can also provide wrist-gesture-based control, for example, by executing gesture processing code 336 (which can be part of the OS 332 or provided separately as desired).

The RF (radio frequency) interface 308 can allow the device 344 to communicate wirelessly with various host devices. The RF interface 308 can include RF transceiver components, such as an antenna and supporting circuitry, to enable data communication over a wireless medium (e.g., using Wi-Fi/IEEE 802.11 family standards), Bluetooth, or other protocols for wireless data communication. The RF interface 308 can be implemented using a combination of hardware (e.g., driver circuits, antennas, modulators/demodulators, encoders/decoders, and other analog and/or digital signal processing circuits) and software components. In some examples, The RF interface 308 can provide near-field communication ("NFC") capability (e.g., implementing the ISO/IEC 18092 standards or the like). In some examples, NFC can support wireless data exchange between devices over a very short range (e.g., 20 cm or less). Multiple different wireless communication protocols and associated hardware can be incorporated into the RF interface 308.

The connector interface 310 can allow the device 344 to communicate with various host devices via a wired communication path, for example, using Universal Serial Bus (USB), universal asynchronous receiver/transmitter (UART), or other protocols for wired data communication. In some examples, the connector interface 310 can provide a power port, allowing the device 344 to receive power, for example, to the charge the battery 340. For example, the connector interface 310 can include a connector such as a mini-USB connector or a custom connector, as well as supporting circuitry. In some examples, the connector can be a custom connector that can provide dedicated power and ground contacts, as well as digital data contacts that can be used to implement different communication technologies in parallel. For example, two pins can be assigned as USB data pins (D+ and D−) and two other pins can be assigned as serial transmit/receive pins (e.g., implementing a UART interface). The assignment of pins to particular communication technologies can be hardware or negotiated while the connection is being established. In some examples, the connector can also provide connections for audio and/or video signals, which can be transmitted to or from host device in analog and/or digital formats.

In some examples, the connector interface 310 and/or the RF interface 308 can be used to support synchronization operations in which data can be transferred from a host device to the device 344 (or vice versa). For example, as described below, a user can customize certain information for the device 344 (e.g., settings related to wrist-gesture control). While the user interface 306 can support data-entry operations, a user may find it more convenient to define customized information on a separate device (e.g., a tablet or smartphone) that can have a larger interface (e.g., including a real or virtual alphanumeric keyboard). The customized information can be transferred to wearable device via a synchronization operation. Synchronization operations can also be used to load and/or update other types of data in the storage subsystem 304, such as media items, application programs, personal data, and/or operating system programs. Synchronization operations can be performed in response to an explicit user request and/or automatically (e.g., when the device 344 resumes communication with a particular host device or in response to either device receiving an update to its copy of synchronized information).

The device sensors 314 can include various electronic, mechanical, electromechanical, optical, and/or other apparatus that can provide information related to external conditions around the device 344. The sensors 314 can provide digital signals to the processing subsystem 302, for example, on a streaming basis or in response to polling by the process subsystem 302 as desired. Any type and combination of device sensors can be used. For example, the device sensors 314 can include an accelerometer 342, a magnetometer 344, a gyroscopic sensor 346, a GPS (global positioning system) receiver 348, optical sensors 362, and barometric sensors 364. One or more of the device sensors 314 can provide information about the location and/or motion of the device 344. For example, the accelerometer 342 can sense acceleration (e.g., relative to freefall) along one or more axes, for example, using piezoelectric or other components in conjunction with associated electronics to produce a signal. The magnetometer 344 can sense an ambient magnetic field (e.g., Earth's magnetic field) and can generate a corresponding electrical signal, which can be interpreted as a compass direction. The gyroscopic sensor 346 can sense rotational motion in one or more directions, for example, using one or more micro-electro-mechanical systems (MEMS) gyroscopes and related control and sense circuitry. The GPS receiver 348 can determine location based on signals received from GPS satellites. The optical sensors 362 can sense one or optical properties of light used, for examples, in determining photoplethsmyogram (PPG) information associated with the user. In some examples, the optical sensors 362 can include ambient light sensors (ALS) to determine ambient light properties. The barometric sensors 364 can sense the atmospheric pressure to resolve vertical location information of the device.

Other sensors can also be included in addition to, or instead of, these examples. For example, a sound sensor can incorporate the microphone 326 together with associated circuitry and/or program code to determine, for example, a decibel level of ambient sound. Temperature sensors, proximity sensors, ultrasound sensors, or the like can also be included.

The strap sensors 316 can include various electronic, mechanical, electromechanical, optical, or other devices that can provide information as to whether device 344 is currently being worn, as well as information about forces that may be acting on the strap due to movement of the user's wrist. For example, the strap sensors 316 can include optical sensors and/or one or more cameras, as described below. In some examples, signals from the strap sensors 316 can be analyzed, for example, using the gesture processing code 336 to identify wrist gestures and/or finger positions based on the sensor signals. Such gestures and/or finger positions can be used to control operations of the device 344.

The power subsystem 312 can provide power and power management capabilities for the device 344. For example, the power subsystem 312 can include a battery 340 (e.g., a rechargeable battery) and associated circuitry to distribute power from the battery 340 to other components of the device 344 that can require electrical power. In some examples, the power subsystem 312 can also include circuitry operable to charge the battery 340, for example, when the connector interface 310 can be connected to a power source. In some examples, the power subsystem 312 can include a "wireless" charger, such as an inductive charger, to charge the battery 340 without relying on the connector interface 310. In some examples, the power subsystem 312 can also include other power sources (e.g., solar cell) in addition to, or instead of, the battery 340.

In some examples, the power subsystem 312 can control power distribution to components within the device 344 to manage power consumption efficiently. For example, the power subsystem 312 can automatically place the device 344 into a "hibernation" (or sleep/inactive) state when the strap sensors 316 or other sensors indicate that the device 344 is not being worn by the user. The hibernation state can be designed to reduce power consumption. For example, the user interface 306 (or components thereof), the RF interface 308, the connector interface 310, and/or the device sensors 314 can be powered down (e.g., to a low-power state or turned off entirely), while the strap sensors 316 can be powered up (either continuously or at intervals) to detect when a user puts on the device 344. In some examples, while the device 344 is being worn, the power subsystem 312 can turn the display 320 and/or other components on or off depending on motion and/or orientation of the device 344 detected by the device sensors 314 and/or strap sensors 316. For instance, if the device 344 can be designed to be worn on a user's wrist, the power subsystem 312 can detect raising and rolling of the user's wrist, as is typically associated with looking at the face of a wristwatch based on information provided by the accelerometer 342. In response to this detected motion, the power subsystem 312 can automatically turn the display 320 and/or the touch sensor 328 on. Similarly, the power subsystem 312 can automatically turn the display 320 and/or the touch sensor 328 off in response to detecting that the user's wrist has returned to a neutral position (e.g., hanging down). As discussed below, in some examples, other sensors can be used to determine the axial orientation of the user's wrist for waking up (e.g., switching from an inactive state to an active state with higher power consumption) the device or putting the device into a hibernation state.

The power subsystem 312 can also provide other power management capabilities, such as regulating power consumption of other components of the device 344 based on the source and the amount of available power, monitoring and storing power in the battery 340, generating user alerts if the stored power drops below a minimum level, etc.

In some examples, control functions of the power sub system 312 can be implemented using programmable or controllable circuits operating in response to control signals generated by the processing subsystem 302 in response to program code executing thereon, or as a separate microprocessor or microcontroller unit (MCU) 360.

Examples of the disclosure can include variations and modifications to the block diagram illustrated in FIG. 3. For example, the strap sensors 316 can be modified, and device 344 can include a user-operable control (e.g., a button or switch such as crown 318) that the user can operate to provide input. The crown 318 can include one or more sensors 338 (e.g., a camera). Controls can also be provided, for example, to turn on or off the display 320, mute or unmute sounds from the speakers 322, etc. The device 344 can include any types and combination of sensors, and in some examples, can include multiple sensors of a given type.

In some examples, a user interface can include any combination of any or all of the components described above, as well as other components not expressly described. For example, the user interface can include just a touch screen, or a touchscreen and a speaker, or a touchscreen and a haptic device. Where the wearable device includes a RF interface, a connector interface can be omitted, and communication between the device 344 and other devices can be conducted using wireless communication protocols. A wired power connection (e.g., for charging a battery of the device 344) can be provided separately for any data connection.

Further, while the device is described with reference to functional blocks, it is to be understood that these blocks are defined for convenience of description and are not intended to imply a particular physical arrangement of component parts. Further, the blocks need not correspond to physically distinct components. Blocks can be configured to perform various operations (e.g., by programming a processor or providing appropriate control circuitry), and various blocks might or might not be reconfigurable depending on how the initial configuration is obtained. Examples of the disclosure can be realized in a variety of apparatuses including electronic devices implemented using any combination of circuitry and software. Furthermore, examples of the disclosure are not limited to requiring every block illustrated in the figure to be implemented in a given wearable device.

A host device (e.g., host device 236 of FIG. 2) can be implemented as an electronic device using blocks similar to those described above (e.g., processors, storage media, user interface devices, data communication interfaces, etc.) and/or other blocks or components. Any electronic device capable of communicating with a particular wearable device can act as a host device with respect to that wearable device. Communication between a host device and a wireless device can be implemented according to any communication protocol (or combination of protocols) that both devices can be programmed or otherwise configured to use. In some examples, such protocols (e.g., Bluetooth) can be used. In some examples, a custom message format and syntax (including, for example, a set of rules for interpreting particular bytes or sequences of bytes in a digital data transmission) can be defined, and messages can be transmitted using standard serial protocols (e.g., a virtual serial port defined in certain Bluetooth standards).

Examples of the disclosure can include systems and methods for scanning the user's veins using near-IR and/or IR sensors. Scanning the user's veins can be used for, e.g., detecting one or more gestures and/or finger positions, where the one or more gestures and/or finger positions can be gestures that may not use touch or audible input. FIGS. 4A-4B illustrate top views of an exemplary user's hand according to examples of the disclosure. The user's hand 401 can include a palmar side, shown as hand 401A, including a plurality of veins 403A and a dorsal side, shown as hand 401B, including a plurality of veins 403B. One or more portable electronic devices can utilize one or more sensors (e.g., a camera) to capture a plurality of images of the user's veins 403. In some examples, the plurality of images can be taken at different times (e.g., consecutive time frames). The device can correlate the veins shown in the plurality of images to the user's joints and one or more poses (e.g., hand poses). From the pose(s), the user's hand movement (e.g., finger movements) can be determined. The device can match one or more gestures and/or finger positions (e.g., by comparing to a statistical model) to the user's hand movement (e.g., finger movements) and can perform one or more device functions (e.g., make a phone call) associated with the determined gesture(s) and/or finger positions.

Figure 5A:
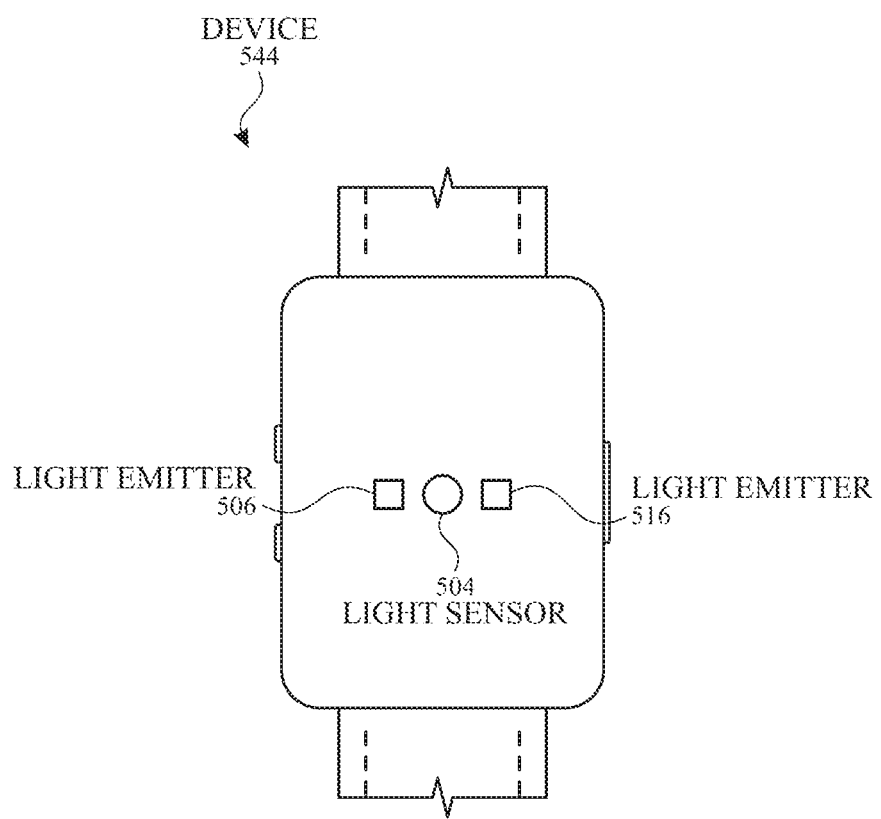
FIG. 5A illustrates a top view of an underside of an exemplary device for determining a PPG signal according to examples of the disclosure.

FIG. 5A illustrates a top view of an underside of an exemplary device for determining a PPG signal according to examples of the disclosure. Device 544 can include light emitters 506 and 516 and a light sensor 504. Light from the light emitter 506 can be incident on the user's skin and can reflect back to be detected by the light sensor 504. Similarly, light from the light emitter 516 can be incident on the user's skin and can reflect back to be detected by the light sensor 504. One or more light emitter-light sensor pairs can be used additionally or alternatively for capturing one or more images of the user's hand (e.g., user's hand 401 illustrated in FIGS. 4A-4B).

Figure 5B:
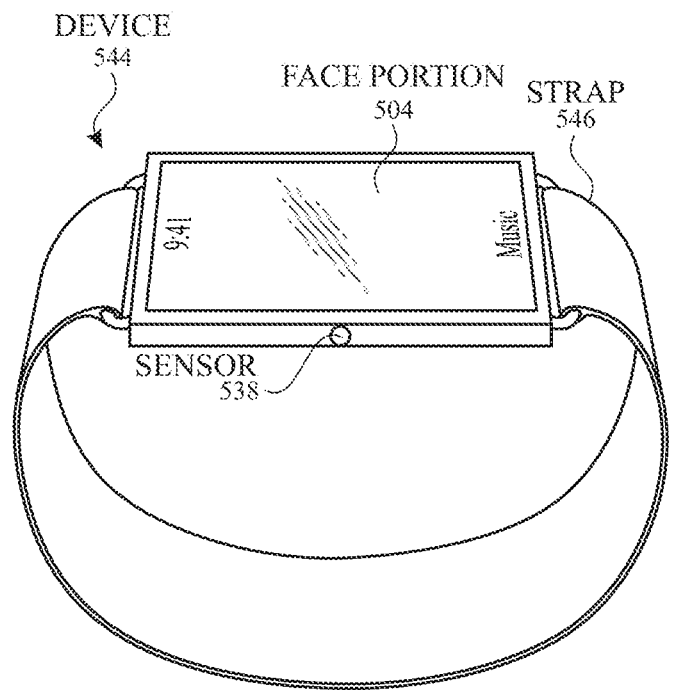
FIG. 5B illustrates a perspective view of an exemplary wearable device having one or more sensors located on the crown of the device according to examples of the disclosure.

In some examples, the device can include one or more sensors located on the crown of the device. FIG. 5B illustrates a perspective view of an exemplary wearable device having one or more sensors located on the crown of the device according to examples of the disclosure. Device 544 can include a face portion 504 and a strap 546. The strap 546 can be connected to a face portion 504 using strap holders (not shown). The crown can be a mechanical component (e.g., a cap atop a stem or shaft for winding a watch) that can be manipulated. For example, the crown can be pressed, rotated, touched, tilted in one or more directions, and/or slid along a track at least partially around a perimeter of the housing of the device 544. The crown can also include one or more sensors 538 (e.g., a camera) for capturing one or more images of the user's hand.

Figure 5C:
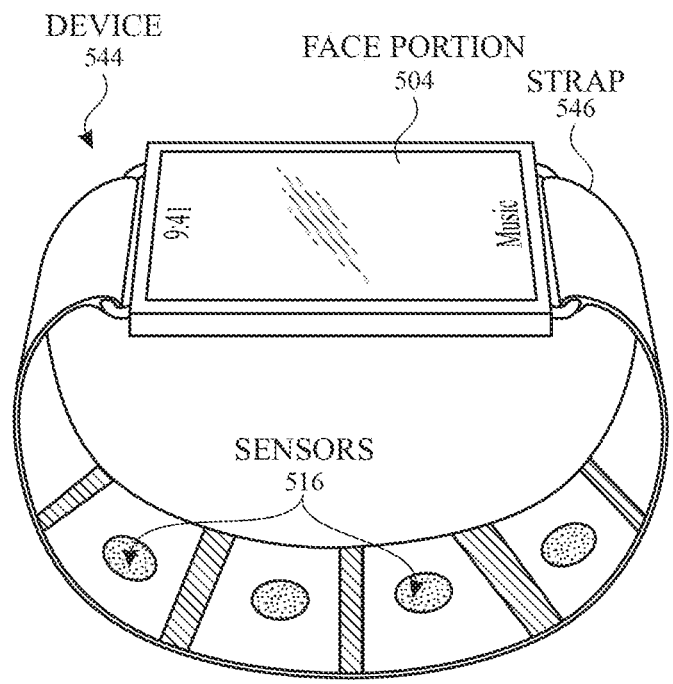
FIG. 5C illustrates a perspective view of an exemplary wearable device having one or more sensors located on the strap according to examples of the disclosure.

In some examples, the device can include one or more sensors located on the strap attached to the device. FIG. 5C illustrates a perspective view of an exemplary wearable device having one or more sensors located on the strap according to examples of the disclosure. In some examples, the strap 546 can include a plurality of flexible sections and/or a plurality of rigid sections. In some examples, the flexible sections can be configured to expand when the user's wrist extends, for example. The sensors 516 can be located on the elastic sections, rigid sections, or both. The sensors 516 can be used for capturing one or more images of the user's hand.

In some examples, the device can include sensor(s) located at multiple locations along the device and/or accessories attached to the device. Sensors can be located at different locations, for example, to capture different information. For example, at least one sensor (e.g., the light emitter 506-light sensor 504 pair illustrated in FIG. 5A) can be configured to image the dorsal side of the user's hand, while at least one other sensor (e.g., sensors 538 illustrated in FIG. 5C) can be configured to image the palmar side of the user's hand.

Figure 6A:
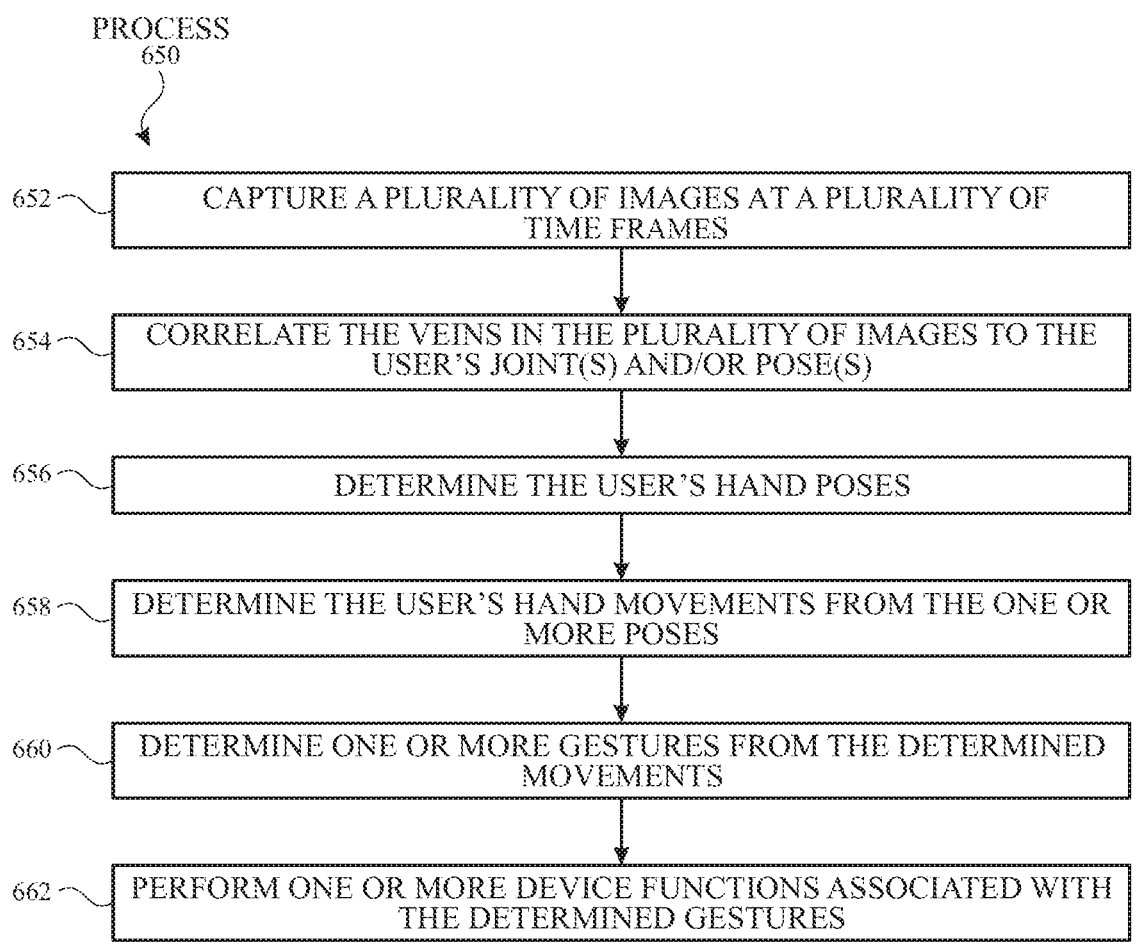
FIG. 6A illustrates an exemplary process for detecting a gesture and/or finger positions according to examples of the disclosure.
Figure 6B:
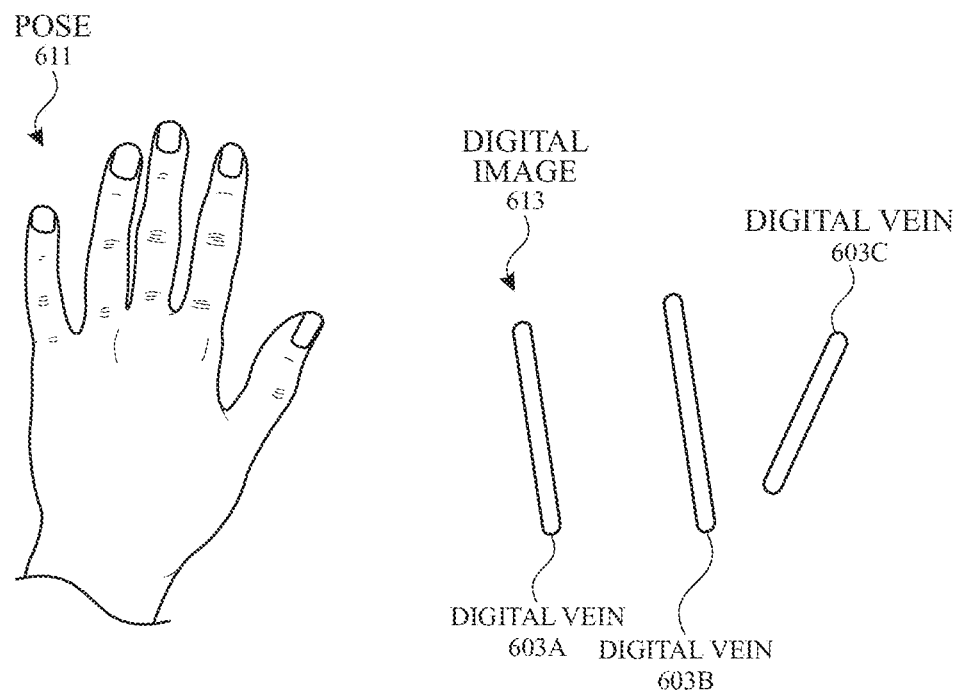
FIGS. 6B-6C illustrate exemplary digital representations of images of the user's veins according to examples of the disclosure.

As discussed above, the device can include one or more sensors (e.g., cameras) to take one or more images of the user's veins, which can be used to detect a gesture and/or finger positions for performing one or more device functions. FIG. 6A illustrates a process for detecting a gesture according to examples of the disclosure. Process 650 can include capturing a plurality of images over a plurality of time frames (step 652). In some examples, the plurality of images can be captured using one or more sensors (e.g., sensors 538 illustrated in FIG. 5B, sensors 516 illustrated in FIG. 5C, etc.). In some examples, the plurality of images (e.g., images of a vein graft) can be converted to representative digital images. For example, as illustrated in FIG. 6B, the user's hand can have a first pose 611, which can be captured during a first time frame using one or more sensors. The device can convert the image into a digital representation such as the digital image 613. The digital image 613 can include digital representations of the veins (e.g., digital vein 603A, digital vein 603B, digital vein 603C, etc.). In some instances, one or more (e.g., consecutive) of the plurality of images may include different poses of the user's hand. In other instances, one or more of the plurality of images may include the same pose of the user's hand. In some examples, a time frame can include a pre-determined amount of time. In some instances, the device can wait a pre-determined delay time between time frames.

In step 654, one or more features (e.g., the user's veins 403 illustrated in FIGS. 4A-4B) in the plurality of images can be correlated to the user's joints and/or one or more poses. The correlation can include matching one or more properties (e.g., location, relative spacing, shape, blood flow, etc.) of the veins to one or more of the user's joints and/or one or more poses. From the images and/or correlations, the device can determine the user's hand pose (step 656 of process 650). For example, as illustrated in FIG. 6B, the device can determine whether the user's index finger is extended based on the shape, angle, and/or size of the veins (e.g., the orientation of digital vein 603B relative to the digital vein 603C, the shape of the digital vein 603C, etc.).

Figure 6C:
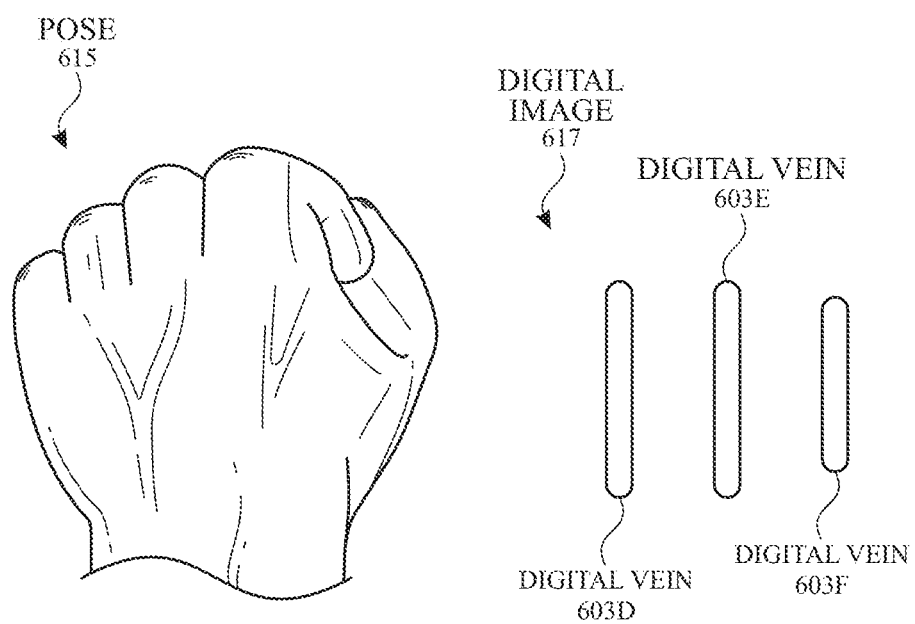

In some examples, the pose(s) can change due to movement of the user's joints, where the movement can also affect the properties of the user's veins. In step 658, the user's hand movements (e.g., finger movements) can be determined from the pose(s). In some examples, the user's hand movements (e.g., finger movements) can be determined using the differences between the pose(s). For example, during a first time frame, the user's hand can have a first pose (e.g., the user's fingers can be spread open as illustrated in FIG. 6B). A first image can capture a first spacing and angle between adjacent veins (e.g., the digital vein 603B and the digital vein 603C). During a subsequent (e.g., second) time frame, the user's hand can have a second pose 615 (e.g., the user's fingers can be closed as illustrated in FIG. 6C), which can be different from the first pose due to movement of the user's joints. The second image can be taken (e.g., from the same viewpoint such as the dorsal side of the user's left hand, as illustrated in FIG. 6C), and the device can convert the image into a digital representation such as the digital image 617. The device can correlate the digital vein 603D to the user's ring finger, the digital vein 603E to the user's middle finger, and the digital vein 603F to the user's index finger. The user's movement(s) can lead to one or more differences in the digital images. For example, the digital vein 603C can be correlated to the same finger as the digital vein 603F, and the differences in the locations of the digital veins can be due to the user's movements.

In some examples, the determined hand movements (e.g., finger movements) can be compared with a pre-determined statistical model (e.g., to improve the accuracy of the determination of the user's hand movements (e.g., finger movements), gestures, and/or finger positions). In some instances, the pre-determined statistical model can include one or more dynamically predicted poses and/or one or more correlated joints. For example, the system can match the first and the second poses to a statistical model to predict what the user's third pose may be. The prediction can be used to prevent a delay in performing one or more device functions (discussed below) and/or for convenience (e.g., the user does not have to perform the third pose).

In step 660, one or more gestures and/or finger positions can be dynamically determined based on the user's hand movements (e.g., finger movements). For example, a gesture and/or finger positions can be associated with a sequence of poses over a plurality of time frames. Using the example given above, the first pose of the user's fingers spread open followed by the second pose of the user's fingers closed can be associated with the gesture of closing an application on a portable electronic device. The association between gestures and/or finger positions and the user's movements can be pre-determined (e.g., located in a library file).

In some examples, the user's hand movement (e.g., finger movement) can include one or more new gestures and/or poses. For example, a new gesture can be a gesture not included in the library file of pre-determined gestures at the time when the user performs the hand movement (e.g., finger movement). The device can determine that the user performed a new gesture and/or pose and can record the new gesture and/or pose (as discussed below). The device can add the new gesture and/or pose to the library file.

In step 662, the device can use the determined gesture and/or pose to perform one or more device functions. Examples of device functions can include, but are not limited to, making a phone call, turning on an application, performing an operation associated with an application, recording a new gesture and/or finger positions, displaying a message on the display, and interacting with virtual objects. For example, a user can interact with virtual objects in three-dimensional space. As an example, on a display of an exemplary device, three cups can be positioned on top of a table. Upon the determination of a "pick up" gesture and/or pose (e.g., the user's fingers are curled, as if an object is being picked up), one of the virtual cups can be displayed as being picked up on the screen, while the user is performing the gesture and/or pose to the air. Subsequently, upon the determination of a "drop" gesture and/or pose (e.g., the user's fingers are opened, as if an object is being dropped), the virtual cup can be displayed as being dropped and shattered on the screen while the user is performing the gesture and/or pose to the air. In this manner, determining the user's gesture and/or finger positions via the examples disclosed herewith can be used for virtual reality (VR) applications.

Figure 6D:
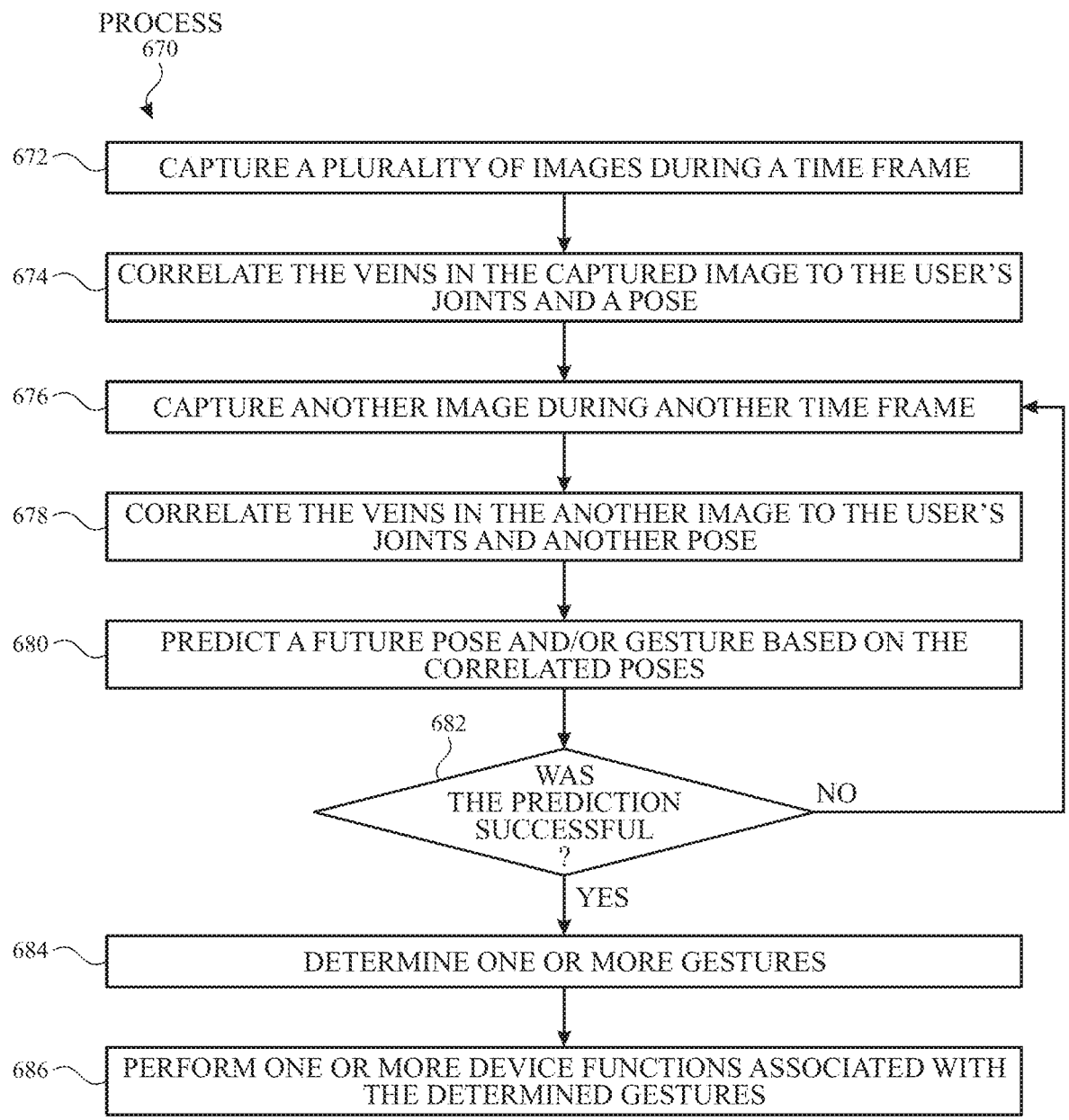
FIG. 6D illustrates an exemplary process for predicting the user's gesture and/or finger positions according to examples of the disclosure.

In some examples, the device can be capable of predicting the user's gesture(s) and/or poses before the user completes the gesture(s) and/or poses, as illustrated in FIG. 6D. Process 670 can include capturing a plurality of images over a plurality of time frames (step 672). In some examples, the plurality of images can be captured using one or more sensors (e.g., sensors 338 illustrated in FIG. 3). A time frame can include a pre-determined amount of time. In some instances, the device can wait a pre-determined delay time between time frames. In some examples, the plurality of images can be images of a vein graft that can be converted to representative digital images. In step 674, one or more features (e.g., the user's veins 403 illustrated in FIGS. 4A-4B) in the plurality of images can be correlated to the user's joints and/or one or more first poses. The correlation can include matching one or more properties (e.g., location, relative spacing, shape, blood flow, etc.) of the veins to the user's joint(s) and/or first pose(s).

In some examples, the first pose(s) can change due to movement of the user's joints, where the movement can also affect the properties of the user's veins. For example, during the plurality of time frames, the user's hand can perform a first pose (e.g., the user's fingers sign the letter "M" in sign language). The device can take a first image of the user's veins, can convert the captured first image into a representative digital first image, and can correlate the veins to the user's joints (e.g., from step 672 and step 674 discussed above).

In step 676, the device can capture a second plurality of images over a second plurality of time frames. In some examples, the second plurality of time frames can immediately follow the first plurality of time frames described in step 672. In some examples, the second plurality of time frames can occur at a later time that does not immediately follow the first plurality of time frames.

In step 678, one or more features (e.g., the user's veins 403 illustrated in FIGS. 4A-4B) in the second plurality of images can be correlated to the user's joints and/or one or more second poses. The correlation can include matching one or more properties (e.g., location, relative spacing, shape, blood flow, etc.) of the veins to one or more of the user's joints and/or one or more second poses. In some examples, the first and second poses can be different poses. In other examples, the first and second poses can be substantially the same pose.

For example, at a second time frame, the user's hand can perform a second pose (e.g., the user's fingers sign the letter "O" in sign language), which can be different from the first pose due to the movement of the user's joints. The device can convert the captured second image into a representative second digital image and can correlate the veins to the user's joints.

In step 680, a future pose and/or gesture can be dynamically predicted following step 678 based on the correlated first and second poses (e.g., from steps 672 to 678 discussed above). In some examples, the prediction can include determining one or more properties (e.g., location, relative spacing, shape, blood flow, etc.) of the veins in the first and second plurality of images and predicting a third pose based on the one or more properties. Additionally or alternatively, the prediction can be based on one or more patterns (e.g., stored in a library file). In other examples, the predicted poses or gestures can be based on a finite set of possible poses or gestures. For example, a predicted third pose can be associated with the letter "M" in sign language based on the first and second pose of "M" and "O" in sign language, respectively. The possible poses or gestures can have a certain confidence value associated with it, where higher confidence values can indicate a higher probability that the prediction is correct. Using the above example, the predicted pose of the letter "M" can have a higher confidence value than a predicted pose of the letter "X." Based on the accuracy of the prediction, the device can dynamically change the confidence value. In some instances, the user can provide an indication as to whether the prediction was correct.

In step 682, the success of the prediction can be determined (e.g., based on a confidence value). If a gesture and/or pose is successfully predicted, then process can proceed to step 684, when one or more gestures and/or pose can be determined based on the prediction. In some examples, the predicted poses or gestures can be compared with a pre-determined statistical model to determine the accuracy of the predicted poses or gestures. In other examples, the success of the predicted poses or gestures can be determined based on the previous poses. For example, following the example above, the third pose of "M" in sign language can be determined to be successfully predicted because the sequence of poses spells a correct word "MOM" in sign language. If a gesture and/or a pose is not successfully predicted, then the prediction process can return to step 676 to capture more images. For example, the captured images may not be sufficient to make an accurate prediction (e.g., the captured images may not include enough samples), so more captured images may be taken to increase the confidence of a predicted pose or gesture. In some examples, upon a determination of an unsuccessful prediction, the device optionally can determine one or more gestures and/or pose without a predicted pose and/or gesture, similar to the process described in FIG. 6A.

In step 684, one or more gestures can be dynamically determined from the correlated poses and predicted poses and/or gestures upon a determination of a successful pose and/or gesture prediction. In some examples, the determined movements can include at least one predicted pose. In some examples, the gestures can be determined using the user's movements (e.g., a sequence of poses determined from steps 672 to 678) over a plurality of time frames and the predicted pose and/or gesture (e.g., from step 680). In some examples, steps 676 and 678 can be repeated until a successful prediction of the gesture(s) and/or pose is achieved.

In some examples, a gesture and/or pose can be determined by correlating the movements with a library file of pre-determined gestures and/or poses. In some examples, the movements can be one or more new gestures and/or poses. For example, a new gesture and/or pose can be a gesture and/or pose not included in a library file. In other examples, the new gesture and/or pose can be added to the library file.

In step 686, one or more device functions associated with the determined gestures and/or pose can be performed. Examples of device functions can include, but are not limited to, making a phone call, turning on an application, performing an operation associated with an application, recording a new gesture and/or pose, and interacting with one or more virtual objects. In some examples, the user can be asked to verify the device function before performing the function to ensure that an accurate pose and/or gesture was predicted.

Figure 7A:
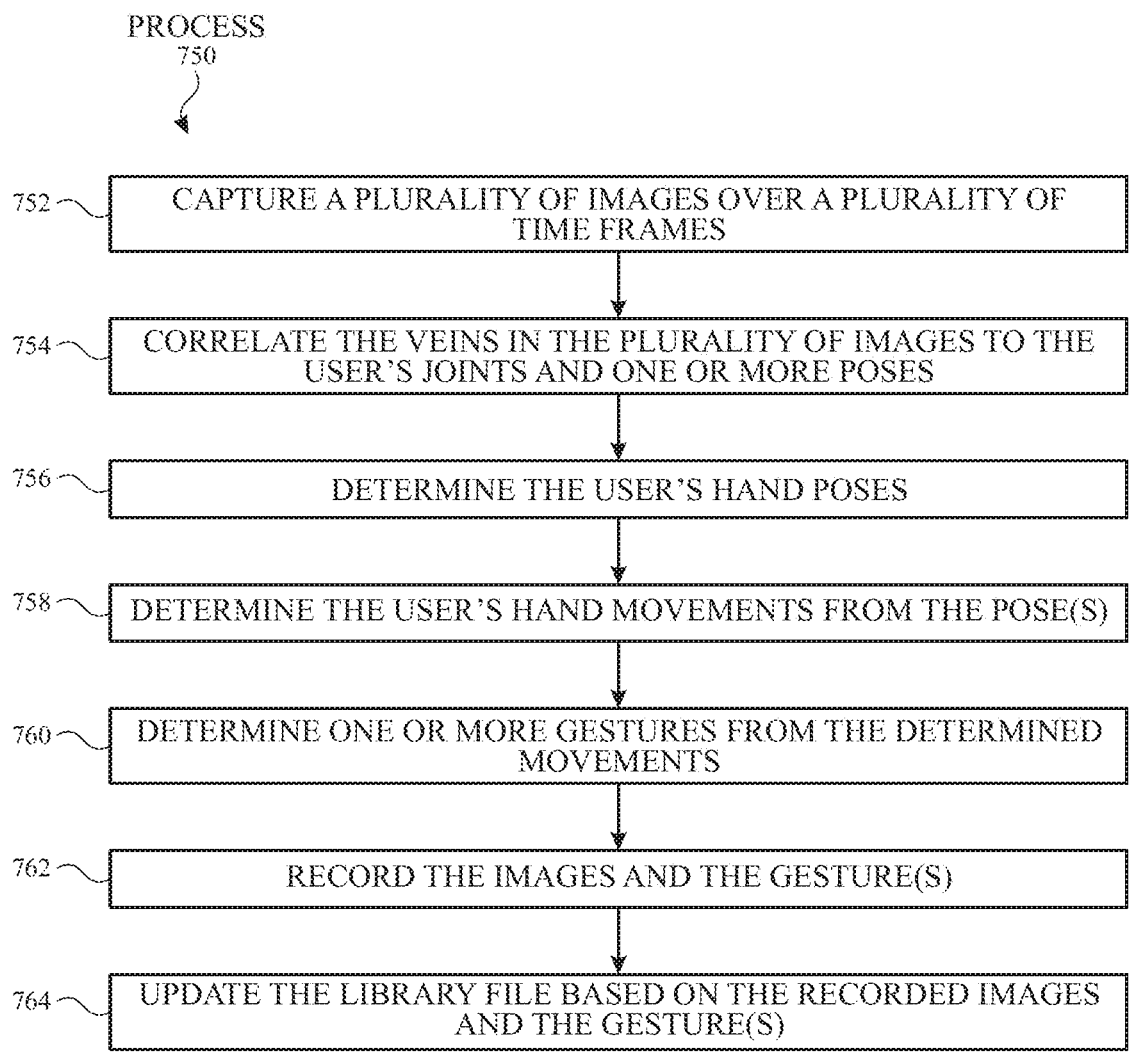
FIG. 7A illustrates an exemplary process for recording one or more gestures and/or finger positions according to examples of the disclosure.

In addition to determining the gesture and/or pose, the device can be capable of recording gestures. FIG. 7A illustrates a process for recording one or more gestures and/or poses according to examples of the disclosure. Process 750 can include capturing a plurality of images over a plurality of time frames (step 752). In some examples, the plurality of images can be captured using one or more sensors (e.g., sensors 338 illustrated in FIG. 3). In some examples, the plurality of images can be images of a vein graft that can be converted to representative digital images. In some instances, one or more of the plurality of images may include the same pose of the user's hand. A time frame can include a pre-determined amount of time. In some instances, the device can wait a pre-determined delay time between time frames.

In step 754, one or more features (e.g., the user's veins 403 illustrated in FIGS. 4A-4B) in the plurality of images can be correlated to the user's joints and/or one or more poses. The correlation can include matching one or more properties (e.g., location, relative spacing, shape, blood flow, etc.) of the veins to one or more of the user's joints and/or one or more poses. For example, the device can take an image of the dorsal side of the user's hand and can correlate the veins to the user's respective fingers.

In step 756, for one or more (e.g., each) images and/or for one or more (e.g., each) vein-joint correlations, the device can determine the user's hand pose(s). For example, the device can determine whether the user's fingers are curled based on the shape and/or size of the veins. The curled fingers can mimic holding a virtual musical instrument (e.g., holding the neck of a guitar), for example.

In some examples, the poses can change due to movement of the user's joints, where the movement can also affect the properties of the user's veins. For example, during a first time frame, the user's hand can have a first pose (e.g., three of the user fingers can be closed in a position representative of a first guitar chord). A first image can be captured and can represent a first orientation pattern of the user's veins. During a subsequent (e.g., second) time frame, the user's hand can have a second pose (e.g., the three fingers can be spread in a position representative of a second guitar chord). A second image can be captured and can represent a second orientation pattern of the user's veins. The second orientation pattern can be different from the first orientation pattern.

In step 758, the user's hand movements (e.g., finger movements) can be determined from the one or more poses. In some examples, the user's hand movements (e.g., finger movements) can be determined from the differences (e.g., the change in shape of the veins associated with each of the user's fingers) between the one or more poses. For example, the first image of the first pose (e.g., the user's closed fingers in the first guitar chord position) can be compared to the second image of the second pose (e.g., the user's spread fingers in the second guitar chord position). The differences in one or more features (e.g., the location of the veins, the angular displacement of the veins, etc.) can be detected.

In some examples, the duration of the time frame can be changed to adjust the granularity of the gesture/pose determination (e.g., including the frequency of image capture and corresponding determinations). Using the example given above, the duration of the time frame can be shortened to capture the transition of the user's fingers from the first guitar chord position to the second guitar chord position. In some instances, if the device is making incorrect gesture and/or pose determinations, the granularity of the gesture and/or pose determination can be adjusted to improve the accuracy of the gesture and/or pose determinations. In some examples, the resolution of the images can be increased to enhance the granularity of the gesture and/or pose determination. For example, additional combinations of emitters and sensors (e.g., by activating additional emitters or sensors or employing unused emitter/sensor pairs) can be employed. Additionally or alternatively, a different (e.g., greater) number of images can be captured during the same amount of total time duration. In this manner, intermediate poses (e.g., poses between the closed and spread fingers) can be captured. In some examples, this duration may be dynamically changed based on a confidence value and/or user input.

In step 760, one or more gestures and/or poses can be determined based on the user's hand movements (e.g., finger movements). For example, a gesture and/or pose can be associated with a sequence of poses over a plurality of time frames. Using the example given above, the first pose of the user's closed fingers followed by the second pose of the user's spread fingers closed can be associated with the shifting between two chords while playing a virtual guitar. The association between gestures and/or poses and the user's movements can be pre-determined (e.g., located in a library file). For example, in the library file, a plurality of curled finger poses can be associated with gestures of a virtual guitar.

In some examples, the user's hand movement (e.g., finger movement) can include one or more new gestures and/or poses. For example, a new gesture and/or pose can be a gesture and/or pose not included in the library file. The device can determine that the user performed a new gesture and/or pose and can record the new gesture and/or pose. The device can add the new gesture and/or pose to the library file. In another example, the new gesture and/or pose can be associated with an uncommon chord (e.g., a gesture and/or pose that has little or no sample in an associated statistical model) on a virtual guitar.

In step 762, the device can record the determined gestures, poses, and/or the images associated with the determined gestures and/or poses. In some examples, the gestures, poses, and/or the associated images can be recorded after determining that the determined gesture and/or pose is a new gesture and/or pose. For example, a user's finger position on the virtual guitar neck can be determined but the chord may be unknown (e.g., not stored in the library file). The user can record the finger positions (e.g., poses) and associate a new chord with the one or more poses. In some examples, the recorded gestures and/or poses and associated images can be classified. For example, gestures and/or poses that include curled fingers may be classified as gestures and/or poses for a virtual guitar.

In some examples, the recorded gesture and/or pose can be standalone. In other words, the recorded gesture and/or pose may not be included in a library file and/or may not affect an attribute of a library file. In other instances, the newly recorded gesture and/or pose can be part of a library file and/or can affect one or more attributes of a library file.

In step 764, one or more library files can be updated based on the recorded images, poses, and/or gestures. In some examples, updating the library file can include modifying the correlation of one or more poses to one or more gestures where the pose(s) and/or gesture(s) may not be pre-existing (i.e., not new). The library file can be updated with one or more information associated with the recorded image, poses, and/or gesture. Exemplary information can include, but is not limited to, the gesture(s), poses, one or more images, statistical models associated with the gesture(s), poses, and/or the image(s), one or more applications associated with the gesture(s) and/or poses, and user characteristics. Additionally or alternatively, updating the library file can include adding and/or modifying an association of one or more gestures and/or poses to one or more device functions.

Figure 7B:
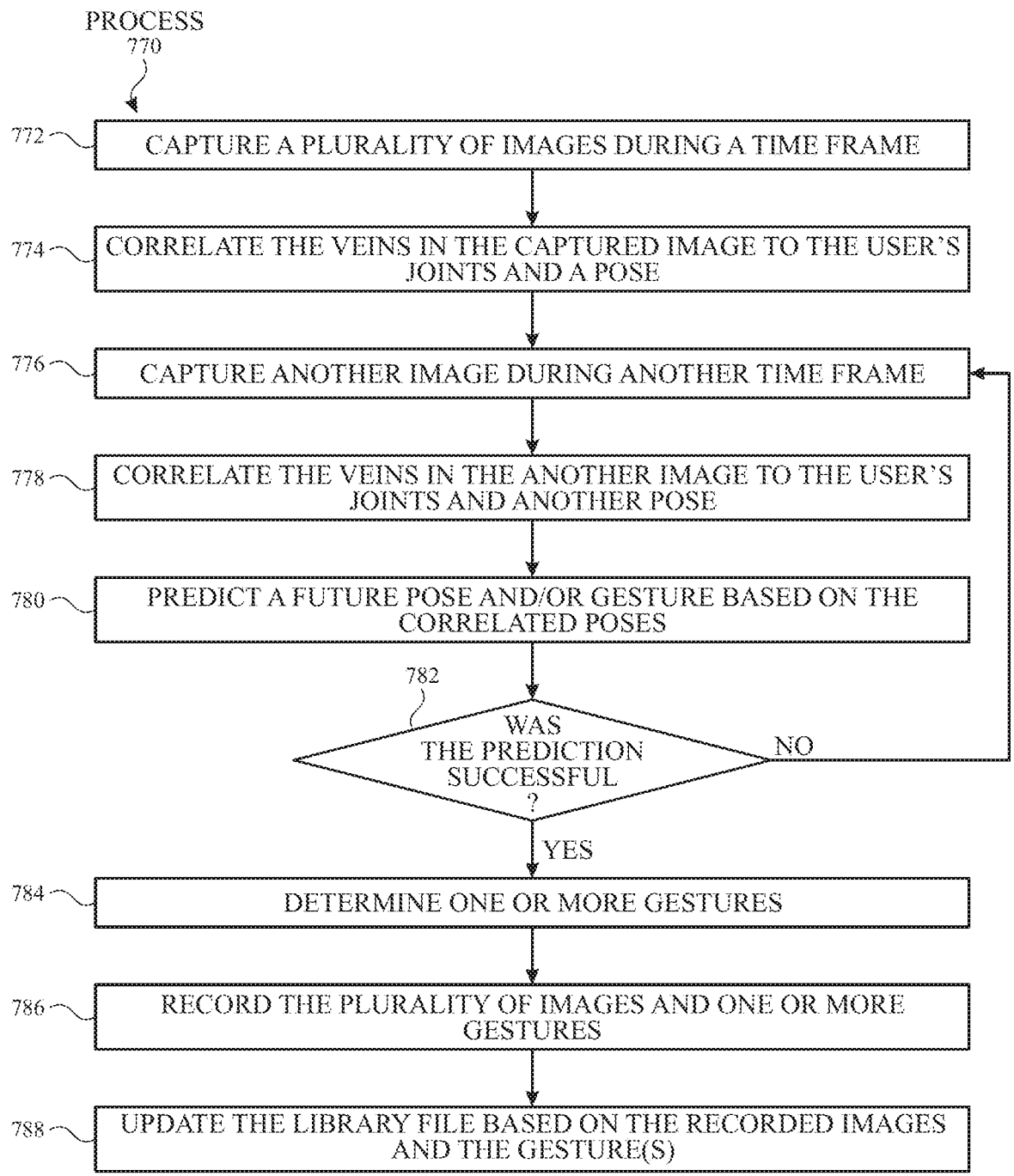
FIG. 7B illustrates an exemplary process for predicting one or more gestures and/or finger positions and recording the prediction according to examples of the disclosure.

In some examples, the device can be capable of predicting the user's gesture(s) and/or poses prior to the user completing the gesture(s) and/or poses and recording the gesture(s) and/or poses, as illustrated in FIG. 7B. Process 770 can include capturing one or more images over one or more time frames (step 772). In some examples, the plurality of images can be captured using one or more sensors (e.g., sensors 338 illustrated in FIG. 3). In some examples, the plurality of images can be images of a vein graft that can be converted to representative digital images. In some instances, one or more of the plurality of images may include the same pose of the user's hand. A time frame can include a pre-determined amount of time. In some instances, the device can wait a pre-determined delay time between time frames.

In step 774, one or more features (e.g., the user's veins 403 illustrated in FIGS. 4A-4B) in the plurality of images can be correlated to the user's joints and/or one or more poses. The correlation can include matching one or more properties (e.g., location, relative spacing, shape, blood flow, etc.) of the veins to one or more of the user's joints and/or one or more poses. For example, the device can take an image of the dorsal side of the user's hand and can correlate the veins to the user's respective fingers. In another example, during a time frame, the user's hand can have a pose (e.g., three of the user fingers can be closed in a position representative of a guitar chord). An image of the user's veins can be captured and correlated to the user's pose.

In step 776, the device can capture one or more second images over one or more second time frames. In some examples, the second plurality of time frames can follow the first plurality of time frames (e.g., step 772). In some examples, the second plurality of time frames can occur at a later time that does not immediately follow the first plurality of time frames.

In step 778, one or more features (e.g., the user's veins 403 illustrated in FIGS. 4A-4B) in the second image(s) can be correlated to the user's joints and/or one or more second poses. The correlation can include matching one or more properties (e.g., location, relative spacing, shape, blood flow, etc.) of the veins to one or more of the user's joints and/or one or more second poses.

In some examples, the first and second poses can be different poses. For example, during a subsequent (e.g., second) time frame following the time frame described in steps 772-774, the user's hand can have a second pose (e.g., the three fingers can be opened in a position representative of a second guitar chord). A second image of the user's veins can be captured and correlated to the user's pose during the subsequent, second time frame. In some examples, upon a determination of a substantially different second pose at a subsequent time frame, the device can proceed with some or all of steps 776-778.

In other examples, the first and second poses can be substantially the same pose. In some examples, upon a determination of a substantially same second pose at a subsequent time frame, the image captured and/or the correlation between the user's veins, fingers, and poses can be forgone. In other instances, the first image can be the same as the second image, and the first correlation can be the same as the second correlation.

In step 780, a future pose and/or gesture can be dynamically predicted based on the correlated first and second poses (e.g., from steps 772-778 discussed above). In some examples, the prediction can include determining one or more properties (e.g., location, relative spacing, shape, blood flow, etc.) of the veins in the first and second pluralities of images and predicting a third pose based on the one or more properties. In other examples, the predicted poses or gestures can be based on a finite set of possible poses or gestures. For example, a predicted third pose can be representative of a barre chord (e.g., index finger straightened and the remaining fingers curled) on a guitar based on the first and second poses representative of closed and opened guitar chords, respectively (e.g., the user can be gesturing to play along to a song). In another example, the device can predict that the user's fingers are closed in a third pose based on the first and second poses of closed and opened fingers (e.g., the user can be performing gestures and/or poses representative of repeating a pattern of a song).

In step 782, the success of the prediction can be determined (e.g., based on a confidence value). In some examples, the predicted poses or gestures can be compared with a pre-determined statistical model to determine the accuracy of the predicted poses or gestures. In other examples, the success of a predicted poses or gestures can be determined based on the previous poses. For example, following the example above, the third pose of a barre chord can be determined to be successfully predicted when the sequence of poses corresponding to a guitar chord correctly plays a song.

If a gesture and/or pose is successfully predicted (e.g., the predicted gesture and/or pose matches a model or the user approves of the prediction), then the process can proceed to step 784, when one or more gestures and/or poses can be dynamically determined from the correlated poses and predicted poses and/or gestures. In some examples, the determined movements can include at least one predicted pose. In some examples, the gestures and/or poses can be determined using the user's movements (e.g., a sequence of poses determined from steps 772-778) over a plurality of time frames and the predicted pose and/or gesture (e.g., from step 780).

If a gesture and/or pose is not successfully predicted, then the prediction process can return to step 776 to capture additional or different images. For example, the captured images may not be sufficient to make an accurate prediction (e.g., the captured images may not include enough samples). In such an instance, more captured images may be useful for increasing the confidence of a predicted pose or gesture. In another example, following the example above, a predicted third pose of a barre chord can be determined to be unsuccessfully predicted when the user's index finger is curled in the actual third pose. In this example, an image of the user's veins in the actual third pose can be captured and correlated before a fourth pose can be predicted. In some examples, steps 776 and 778 can be repeated until a successful prediction before one or more gestures and/or poses can be determined. In some examples, upon a determination of an unsuccessful prediction, the device optionally can determine and record one or more gestures and/or poses without a predicted pose and/or gesture.

In some examples, the user's hand movement (e.g., finger movement) can include one or more new gestures and/or poses. For example, a new gesture and/or pose can be a gesture and/or pose not included in the library file. The device can determine that the user performed a new gesture and/or pose and can record the new gesture and/or pose in step 786. In some examples, the recorded gestures and/or pose and associated images can be classified (e.g., associated with a certain group). For example, gestures and/or poses that include curled fingers may be classified as gestures and/or poses for a virtual guitar.

In some examples, the recorded gesture and/or pose can be standalone. In other words, the recorded gesture and/or pose may not belong to a library file or may not affect any attribute of a library file. In other instances, the newly recorded gesture and/or pose can be part of a library file or can affect one or more attributes of a library file.

In step 788, one or more library files can be updated based on the recorded images, poses, and/or gestures. A library file can be updated with one or more information associated with the recorded image, poses, and/or gesture. Exemplary information can include, but is not limited to, the gesture(s), poses, one or more images, statistical models associated with the gesture(s), poses, and/or the image(s), one or more applications associated with the gesture(s), poses, and user characteristics. In some examples, the newly updated library file can be incorporated into future predictions, accuracy determinations, and the like. For example, a library file associated with gestures and/or poses for playing along to a song can be updated, allowing faster and more accurate correlations and predictions when a user plays passages of the song in the future.

A method for determining hand gestures by an electronic device is disclosed. The method can comprise: capturing one or more first images of one or more veins in a hand at a first time; capturing one or more second images of the one or more veins in the hand at a second time, different from the first time; determining a first hand pose based on the one or more first images; determining a second hand pose based on the one or more second images; and determining a gesture based on at least the first and second hand poses. Additionally or alternatively, in some examples, the determination of a first hand pose includes correlating the one or more veins in the one or more first images to one or more joints of the hand, wherein the determination of a second hand pose includes correlating the one or more veins in the one or more second images to one or more joints of the hand, and wherein the determination of a gesture includes: detecting one or more differences in properties of the one or more veins in the first and second images to determine one or more hand movements, wherein the gesture is further based on the one or more hand movements. Additionally or alternatively, in some examples, the properties can be one or more of location, relative spacing, shape, displacement, and blood flow. Additionally or alternatively, in some examples, the correlation of the one or more veins in the one or more first images and the correlation of the one or more veins in the one or more second are based on at least a predetermined model. Additionally or alternatively, in some examples, the method further comprises predicting a third hand pose based on the first and second hand poses. Additionally or alternatively, in some examples, the method further comprises determining whether the prediction was successful; and in accordance with a determination that the prediction was unsuccessful: capturing one or more third images of the one or more veins in the hand at a third time; and determining the third hand pose based at least on the one or more third images. Additionally or alternatively, in some examples, the method further comprises: determining whether the prediction was successful; and dynamically updating a confidence value based on the determined success of the prediction. Additionally or alternatively, in some examples, predicting the third hand pose includes: determining or receiving an associated confidence value, wherein the prediction is based on the confidence value. Additionally or alternatively, in some examples, the determination of the gesture is based on a sequence of poses including the first pose and the second pose. Additionally or alternatively, in some examples, the method further comprises: verifying whether the determination of the gesture was correct; and in accordance with the determination of the gesture not being correct, dynamically increasing a granularity of capturing the one or more first images, the one or more second images, or both. Additionally or alternatively, in some examples, the method further comprises: determining one or more operations of the electronic device associated with the gesture; and executing the one or more operations on the electronic device when the gesture is determined. Additionally or alternatively, in some examples, the method further comprises: determining whether the gesture is included in a library file; and in accordance with the gesture not being included in the library file, recording information associated with the gesture in the library file, wherein the information includes one or more of the gesture, the one or more first images, the one or more second images, statistical models associated with the hand gesture, one or more applications associated with the hand gesture, and user characteristics. Additionally or alternatively, in some examples, the method further comprises: updating a library file using the determined hand gesture. Additionally or alternatively, in some examples, the method further comprises: classifying the hand gesture into a category of gestures; and recording the hand gesture in the respective category. Additionally or alternatively, in some examples, the method further comprises: updating an association of the one or more recorded hand gestures to a second device operation, wherein the one or more recorded information is associated with a first device operation prior to the update.

An electronic device is disclosed. The electronic device can comprise: one or more sensors, the sensors configured to capture one or more first images of one or more veins in a hand; and a processor configured to: receive the one or more first images, receive the one or more second images, convert the one or more first captured images and the one or more second captured images to first and second digital representations, respectively, detect one or more differences between the first digital representation and the second digital representation, determine one or more hand movements based on the one or more differences, determine one or more hand gestures based on the one or more determined movements, and perform one or more operations on the electronic device based on the one or more determined hand gestures. Additionally or alternatively, in some examples, the one or more sensors are located on one or more of a side of the device, an underside of the device, and a strap of the device. Additionally or alternatively, in some examples, the one or more sensors are PPG sensors located on an underside of the device. Additionally or alternatively, in some examples, the one or more sensors include a camera located on a crown of the device. Additionally or alternatively, in some examples, the one or more sensors are one or more of near-IR sensors, IR sensors, or both.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for determining hand gestures by an electronic device, the method comprising:
   capturing one or more first images of one or more veins in a hand at a first time;
   capturing one or more second images of the one or more veins in the hand at a second time, different from the first time;
   determining a first hand pose based on the one or more first images, wherein determining the first hand pose includes correlating the one or more veins in the one or more first images to one or more joints of the hand;
   determining a second hand pose based on the one or more second images, wherein determining the second hand pose includes correlating the one or more veins in the one or more second images to one or more joints of the hand; and
   determining a gesture based on at least the first hand pose and the second hand pose.

2. The method of claim 1,
   wherein the determination of a gesture includes:
   detecting one or more differences in properties of the one or more veins in the one or more first images and the one or more second images to determine one or more hand movements, wherein the gesture is further based on the one or more hand movements.

3. The method of claim 2, wherein the properties can be one or more of location, relative spacing, shape, displacement, and blood flow.

4. The method of claim 2, wherein the correlation of the one or more veins in the one or more first images and the correlation of the one or more veins in the one or more second are based on at least a predetermined model.

5. The method of claim 1, further comprising predicting a third hand pose based on the first hand pose and the second hand pose.

6. The method of claim 5, further comprising:
   determining whether the prediction was unsuccessful; and
   in accordance with the prediction being unsuccessful:
   capturing one or more third images of the one or more veins in the hand at a third time; and
   determining the third hand pose based at least on one or more third images.

7. The method of claim 5, further comprising:
   determining whether the prediction was successful; and
   dynamically updating a confidence value based on a determined success of the prediction.

8. The method of claim 7, wherein predicting the third hand pose includes:
   determining or receiving an associated confidence value, wherein the prediction is based on the confidence value.

9. The method of claim 1, wherein the determination of the gesture is based on a sequence of poses including the first hand pose and the second hand pose.

10. The method of claim 1, further comprising:
    determining the determined gesture was incorrect; and
    in accordance with the gesture being incorrect, dynamically increasing a granularity of capturing the one or more first images, the one or more second images, or both.

11. The method of claim 1, further comprising:
    determining one or more operations of the electronic device associated with the gesture; and
    executing the one or more operations on the electronic device when the gesture is determined.

12. The method of claim 1, further comprising:
    determining whether the gesture is included in a library file; and
    in accordance with the gesture not being included in the library file, recording information associated with the gesture in the library file,
    wherein the information includes one or more of the gesture, the one or more first images, the one or more second images, statistical models associated with the gesture, one or more applications associated with the gesture, and user characteristics.

13. The method of claim 1, further comprising:
    updating a library file with the gesture.

14. The method of claim 13, further comprising:
    classifying the gesture into a category of gestures; and recording the gesture in the respective category.

15. The method of claim 12, the method further comprising:
updating an association of the recorded information to a second device operation, wherein the recorded information is associated with a first device operation prior to the update.

16. An electronic device comprising:
one or more sensors, the one or more sensors configured to capture one or more first images of one or more veins in a hand and capture one or more second images of the one or more veins in the hand; and
a processor configured to:
receive the captured one or more first images,
receive the captured one or more second images,
convert the captured one or more first images and the captured one or more second images to a first digital representation and a second digital representation, respectively,
detect one or more differences between the first digital representation and the second digital representation,
determine one or more hand movements based on the one or more differences, wherein the determination of the one or more hand movements includes correlating one or more veins in the one or more first images to one or more joints of the hand,
determine one or more hand gestures based on the determined one or more hand movements, and
perform one or more operations on the electronic device based on the determined one or more hand gestures.

17. The electronic device of claim 16, wherein the one or more sensors are located on one or more of a side of the electronic device, an underside of the electronic device, and a strap of the electronic device.

18. The electronic device of claim 17, wherein the one or more sensors are PPG sensors located on the underside of the electronic device.

19. The electronic device of claim 16, wherein the one or more sensors include a camera located on a crown of the electronic device.

20. The electronic device of claim 16, wherein the one or more sensors are one or more of near-IR sensors, IR sensors, or both.

* * * * *